US008829847B2

(12) United States Patent
Eaton et al.

(10) Patent No.: US 8,829,847 B2
(45) Date of Patent: Sep. 9, 2014

(54) HYBRID BATTERY SYSTEM FOR PORTABLE ELECTRONIC DEVICES

(75) Inventors: Eric Thomas Eaton, Lake Worth, FL (US); Dusan Veselic, Oakville (CA); Jeffrey Charles Bos, Waterloo (CA)

(73) Assignee: BlackBerry Limited, Waterloo Ontario (CA)

( * ) Notice: Subject to any disclaimer, the term of this patent is extended or adjusted under 35 U.S.C. 154(b) by 381 days.

(21) Appl. No.: 13/286,669

(22) Filed: Nov. 1, 2011

(65) Prior Publication Data

US 2013/0106341 A1 May 2, 2013

(51) Int. Cl.
*H02J 7/00* (2006.01)
*H01M 8/04* (2006.01)
*H01M 10/42* (2006.01)
*H01M 16/00* (2006.01)
*H01M 10/44* (2006.01)
*H01M 6/50* (2006.01)
*H01G 11/08* (2013.01)
*H01M 10/052* (2010.01)

(52) U.S. Cl.
CPC .......... *H01M 16/00* (2013.01); *H01M 8/04298* (2013.01); *Y02E 60/12* (2013.01); *H01M 10/4207* (2013.01); *H01M 6/5033* (2013.01); *H01M 16/003* (2013.01); *Y02B 90/18* (2013.01); *H01G 11/08* (2013.01); *H01M 2220/30* (2013.01); *H01M 10/052* (2013.01); *H01M 2250/30* (2013.01); *H01M 10/441* (2013.01); *Y02E 60/50* (2013.01)
USPC ........................................................ 320/101

(58) Field of Classification Search
USPC ........................................................ 320/101
See application file for complete search history.

(56) References Cited

U.S. PATENT DOCUMENTS 6,639,381 B2 10/2003 Tamura et al.
7,038,333 B2 5/2006 Bourilkov et al.
(Continued)

FOREIGN PATENT DOCUMENTS

CN 201742147 2/2011
EP 0963054 A1 12/1999
(Continued)

OTHER PUBLICATIONS

Sony Hybrid Fuel Cell, http://thefutureofthings.com/pod/6763/sony-hybrid-fuel-cell.html, copyright 2011.

(Continued)

*Primary Examiner* — Arun Williams
(74) *Attorney, Agent, or Firm* — Jose Gutman; Fleit Gibbons Gutman Bongini & Bianco PL

(57) ABSTRACT

A power management method with a portable electronic device (100) includes identifying, with a controller (202) of the portable electronic device, a power consumption event in the portable electronic device, the power consumption event having a power consumption requirement. The method further includes selecting (818), in response to the identifying, one of a collection of energy storage devices (304, 306, 308, 320) in an energy storage device farm (218) for the portable electronic device, the selecting being based at least on the power consumption requirement of the power consumption event and on one or more characteristics of the one of the plurality of energy storage devices. The portable electronic device executes the power consumption event using energy stored in the selected one of the plurality of energy storage devices. The portable electronic device (100) may be a mobile phone or other wireless communication device.

14 Claims, 9 Drawing Sheets

(56) References Cited

U.S. PATENT DOCUMENTS

| | | |
|---|---|---|
| 7,095,210 B2 | 8/2006 | Tamura et al. |
| 7,316,855 B2 | 1/2008 | Lawrence et al. |
| 7,535,122 B2 | 5/2009 | Visairo-Cruz et al. |
| 7,739,524 B2 | 6/2010 | Mangione-Smith |
| 2003/0169022 A1 | 9/2003 | Turner et al. |
| 2004/0100149 A1 | 5/2004 | Lai |
| 2004/0174072 A1 | 9/2004 | Bourilkov et al. |
| 2006/0240291 A1 | 10/2006 | Kim et al. |
| 2007/0212596 A1 | 9/2007 | Nebrigic et al. |
| 2008/0045275 A1 | 2/2008 | Le |
| 2008/0057894 A1 | 3/2008 | Aleksic et al. |
| 2008/0059000 A1 | 3/2008 | Hornick et al. |
| 2008/0059089 A1 | 3/2008 | Hornick et al. |
| 2008/0129219 A1 | 6/2008 | Smith et al. |
| 2008/0171239 A1 | 7/2008 | Tucker et al. |
| 2008/0197801 A1 | 8/2008 | Manor et al. |
| 2009/0085409 A1 | 4/2009 | Kearney-Fischer et al. |
| 2009/0225230 A1 | 9/2009 | Arroyo |
| 2010/0013647 A1 | 1/2010 | Morris et al. |
| 2010/0060231 A1* | 3/2010 | Trainor et al. ............... 320/103 |
| 2010/0084918 A1 | 4/2010 | Fells et al. |
| 2010/0148582 A1* | 6/2010 | Carter ............................ 307/48 |
| 2010/0318234 A1 | 12/2010 | Moore et al. |
| 2011/0018491 A1* | 1/2011 | Yoshida et al. ............... 320/101 |
| 2011/0072292 A1 | 3/2011 | Khawand |
| 2011/0115432 A1 | 5/2011 | El-Maleh |
| 2011/0178745 A1 | 7/2011 | Kobayashi |

FOREIGN PATENT DOCUMENTS

| | | |
|---|---|---|
| GB | 2401261 A | 11/2004 |
| WO | 2007/100961 A2 | 9/2007 |

OTHER PUBLICATIONS

International Search Report and Written Opinion dated Jan. 14, 2013 for PCT/CA2012/050763.

Partial European Search Report dated Mar. 30, 2012 for EP application No. 11187412.9.

\* cited by examiner

221

| | 612 | 614 | 616 | 618 |
|---|---|---|---|---|
| 602 → | PCE 1 | POWER REQ. | DURATION | RELATED EVENT INFO |
| 604 → | PCE 2 | POWER REQ. | DURATION | RELATED EVENT INFO |
| 606 → | PCE 3 | POWER REQ. | DURATION | RELATED EVENT INFO |
| 608 → | PCE 4 | POWER REQ. | DURATION | RELATED EVENT INFO |
| 610 → | ⋮ | | | |

POWER CONSUMPTION EVENT TYPE LIST (601)

| | 630 | 632 | 634 | 636 |
|---|---|---|---|---|
| 622 → | PCE 3 | EXPECTED DURATION | ESD ASSIGNED | ... |
| 624 → | PCE 2 | EXPECTED DURATION | ESD ASSIGNED | ... |
| 626 → | PCE 4 | EXPECTED DURATION | ESD ASSIGNED | ... |
| 628 → | ⋮ | | | |

POWER CONSUMPTION EVENT QUEUE (620)

FIG. 6

HYBRID BATTERY SYSTEM FOR PORTABLE ELECTRONIC DEVICES

FIELD OF THE DISCLOSURE

The present disclosure generally relates to portable electronic devices, and more particularly to a hybrid multi-battery power source management system for portable electronic devices.

BACKGROUND

Efficient power management for portable electronic devices, such as wireless communication devices, is important. No single battery is ideally suited for all demands within a wireless communication device. However, typically today a single battery with a multitude of DC-DC converters is the primary architecture for wireless communication devices. This results in a compromise on overall power management system performance. Therefore, the overall energy efficiency and user experience of current power management systems suffer from reduced battery life performance and reduced user experiences.

While wireless communication devices have previously included multiple batteries of different battery technologies, the multiple battery architectures served either to meet peak current loads where a primary battery alone was not able to source sufficient current to meet peak current load requirements, or served to provide backup power for certain memory circuits while a primary battery was temporarily removed and replaced. However, such multiple battery architectures and associated methods did not address the problem of maximizing overall battery life performance.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various examples and to explain various principles and advantages all in accordance with the present disclosure, in which:

FIG. 6 is a block diagram showing a power consumption event profile according to one example;

DETAILED DESCRIPTION

Figure 1:
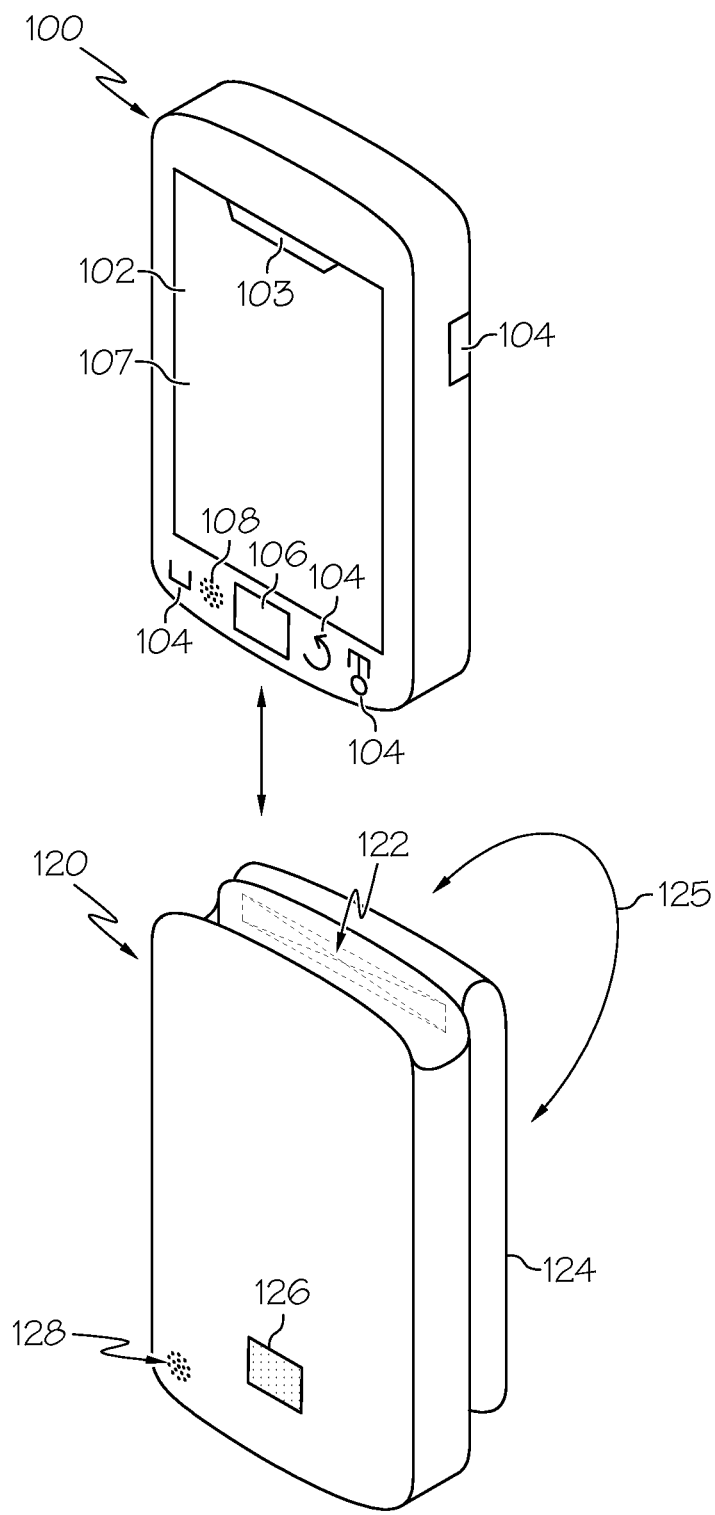
FIG. 1 is a perspective view of a mobile phone and a holster case, according to one example.

As required, detailed examples are disclosed herein; however, it is to be understood that the disclosed examples are non-limiting and that the systems and methods described below can take various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description. The plural of a term includes the singular, and any term indicative of a male or female gender should be understood to include the alternate gender.

DEFINITIONS

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e., open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a Smartphone, a two-way pager, a wireless messaging device, a tablet/computer, a laptop/computer, a personal digital assistant, and other similar devices.

The term "portable electronic device" is intended to broadly cover many different types of electronic devices that are portable. For example, and not for any limitation, a portable electronic device can include any one or a combination of the following: a wireless communication device, a laptop computer, a notebook computer, a personal computer, a Personal Digital Assistant, a tablet computer, a gaming unit, and other handheld electronic devices that can be carried on one's person.

The term "energy storage device" is intended to broadly cover many different types of electrical energy storage devices that are portable and compatible with use in connection with a portable electronic device. For example, and not for any limitation, an energy storage device can include any one or a combination of the following: a capacitor, and inductor, a battery of any technology, a fuel cell, and an energy harvesting device.

The term "energy harvesting device" is intended to broadly cover many different types of energy harvesting devices that capture electrical energy, either directly or through conversion, from external ambient energy sources (e.g., solar power, thermal energy, wind energy, salinity gradients, and kinetic energy), and store the captured electrical energy for use with a portable electronic devices.

The term "energy storage device farm" means a collection of two or more energy storage devices that are used for providing electrical power to circuits used in connection with a portable electronic device. Each of the two or more energy storage devices is not limited to being physically located in a portable electronic device, and is not limited to being physically located in any particular mechanical arrangement relative to any other energy storage device in the collection.

The term "power consumption event" means an electrical power consuming load that occurs in an electrical circuit of a portable electronic device during a time period.

Any of the terms "electric circuit load" or "circuit load" or "load", as used herein, means the power consumed by a circuit connected to a defined electrical terminal.

DESCRIPTION OF DETAILED EXAMPLES

In accordance with various embodiments of the present disclosure, multiple energy storage devices are proposed where the unique energy storage and power supply capabilities of each energy storage device is used to maximize overall battery life performance and user experience for a portable electronic device as well as the user experience thereof.

The term "user experience" according to the present disclosure, includes, for example and not for limitation, any one or a combination of the following user experiences, and device conditions and events: 1) a user's overall sense of unlimited (or significantly beyond conventional expectations) available power supply while using the portable electronic device; 2) the user's overall sense of available power supply to quickly have the portable electronic device ready to perform certain user requested tasks; and 3) the user's overall sense of available power supply to quickly have the portable electronic device ready to perform certain user requested tasks in charge-priority order and/or in energy-store-potential order.

Each energy storage device technology has different advantages and disadvantages. Characteristics such as charge time, discharge rate, leakage current, energy density, nominal voltage, are just a few of the parameters that are typically traded off between energy storage device technologies.

In accordance with one or more embodiments of the present disclosure, multiple energy storage devices are used in connection with a portable electronic device, such as a mobile phone device 100. The mobile phone 100 uses new and novel processes, with smart power management algorithms, to leverage the positive characteristics of each of the energy storage devices while reducing the negative characteristics thereof. A main objective is to maximize overall battery life performance for the portable electronic device 100 as well as to maximize the user's positive experiences thereof.

A simple non-limiting example would be the combination of a fuel cell, a lithium battery, a SuperCapacitor, and a 1 Volt battery, in an energy storage device farm for a mobile phone. This is only an illustrative example.

The fuel cell, in this example, includes two stacked cells (approx 1.8 volts) and provides a primary energy storage device for the mobile phone due to fuel cell's large energy density capability (and large energy storage capacity, but low power output). The mobile phone then uses the smaller milliamp-hour (mAHr) (and lower energy storage capacity, but higher power output) secondary batteries, i.e., the lithium battery and the 1 Volt battery, for the actual operation of the circuits of the mobile phone. The SuperCapacitor (a type of capacitor having high capacitance, and sometimes also referred to as an ultracapacitor), especially the new generation of SuperCapacitor, (which has lower energy storage capacity than the fuel cell and the secondary batteries, but has the highest power output) can be charged 'just in time' before the stored electrical power is to be used, for example and not for limitation, in connection with such device circuit operations as: powering a power amplifier (PA) of a wireless transmitter circuit in the mobile phone, powering a transceiver (Rx/Tx) circuit, and powering display and displaying lighting circuits. The SuperCapacitor can be charged in seconds. It (especially the new generation of SuperCapacitor) also has the very high power output needed to supply power for the PA during wireless transmitter circuit operation. It should be noted that while the SuperCapacitor is used as a high power output device in this example, other power sources may be used as alternative power sources with comparable power output capabilities in various applications. For example and not for limitation, a lithium battery would be a very good alternative power source for use in supplying high power to a PA of a wireless transmitter circuit in the mobile phone.

There is typically no surprise to the mobile phone that it is imminently going to initiate a data transmit operation. The mobile phone, for example, can recognize that a user has pressed a reply key in response to an email (or a text message) and has initiated text entry to send the text message in a reply email (or a reply text message). The reply key is configured to receive user input that indicates that a pending high energy demand event is imminent. A wireless transmit operation, using the PA transmitter circuit, is imminent. Therefore, the mobile phone can detect that the SuperCapacitor is low on energy and then a controller can start an electrical energy transfer (movement) operation directing energy movement to, and maintaining an electrical charge on, the SuperCapacitor 'just in time' before executing the imminent power consumption event.

The lithium battery can now be smaller than typical in prior art devices due to the added support from the SuperCapacitor. Charging the 1 Volt battery that, for example, drives the lower voltage RF front end (such as used with wireless receiver circuits) can be charged from a 1.8 volt source rather than a 3.3 volt source, which will improve efficiencies there as well.

Figure 7:
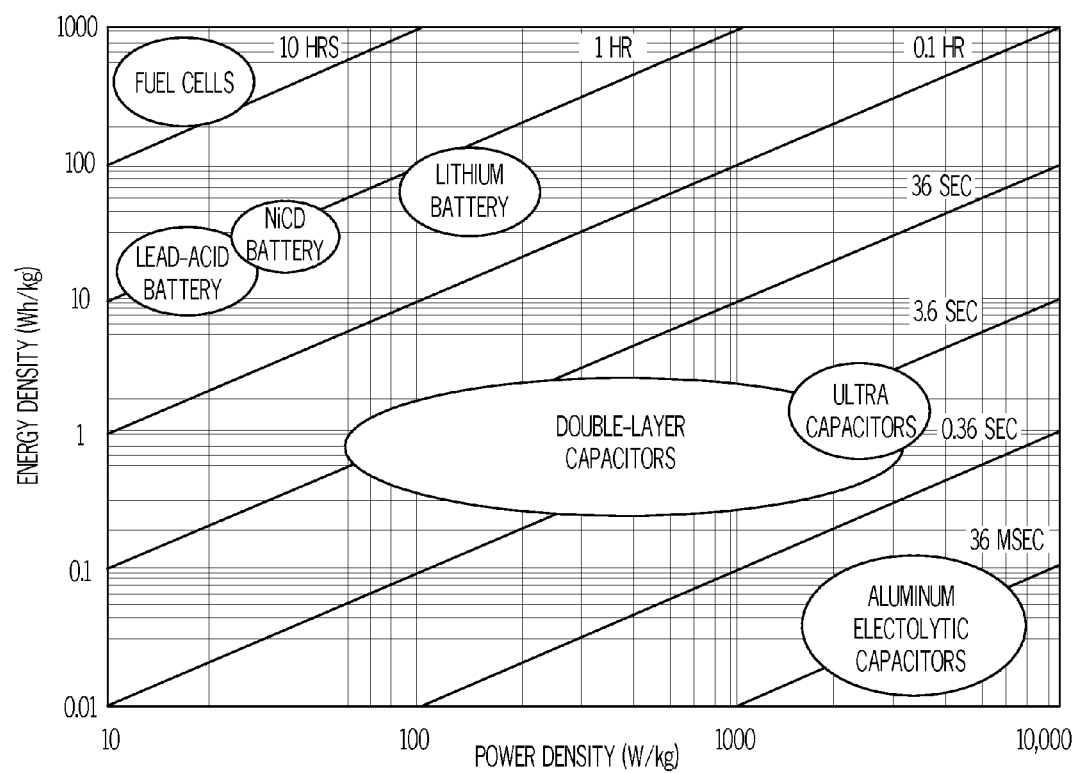
FIG. 7 is a Ragone plot diagram illustrating a comparison of energy density to power density for various electro-chemical energy storage device technologies.

As shown in FIG. 7, fuel cells have an energy density that is approximately 10× that of current lithium battery cells. Therefore, a product engineering design strategy could dedicate, for example, 50% of the physical volume that would be allocated to a lithium battery cell instead to the fuel cell. Thereby, the fuel cell could store 5 times the amount of energy for powering a portable electronic device than by using only the larger lithium battery.

The other 50% of the volume, for example, could be used by smaller than typical milliamp-hour (mAHr) batteries of different technologies. Thus, the portable electronic device could have more energy stored (i.e., more energy storage capacity) in an energy storage device farm without increasing overall physical volume of the portable electronic device.

In general, the bulk of the electrical energy would be stored in an energy storage device that had minimal leakage current and a nominal voltage that was close to the circuit components that consumed the most amount of energy. In this example, it would result in a minimal amount of loss of power, such as due to use of DC to DC converters, and would maximize the amount of electrical energy stored and used by the portable electronic device.

A new power management process, with novel algorithms, used for managing the electrical energy storage capacity and power output capacity balanced against the electrical power consumption requirements of the portable electronic device, is a unique aspect of the present disclosure. A main objective of this management and balance of requirements is to maximize overall battery life for the portable electronic device and to maximize a positive user experience using the portable electronic device with such overall enhanced battery life.

As one example, a power manager for a wireless communication device such as a mobile phone may detect an imminent high power consumption event, such as a wireless transmit operation to wirelessly transmit a radio frequency signal from a wireless transmitter circuit of the portable electronic device. The power manager then plans for the upcoming high power consumption event by transferring (moving) energy between a collection of energy storage devices that then can be used to serve electrical power to a wireless transmitter circuit load to meet the particular requirements of the high power consumption event.

As a second example, a power manager can track over time a user's pattern of use (i.e., usage pattern) of the mobile phone. A user profile can store information memorializing the usage pattern, and which can be maintained and updated by the power manager. Based on mobile phone usage activity pattern, for example, the power manager can detect little to no daily user usage activity from 1 am to 6 am. Additionally, the power manager can determine that, for example, a 1 volt battery cell used by the mobile phone may have a higher than desired self discharge current, which would waste energy during times of no or little use (e.g., a low-activity interval). Such low-activity interval constitutes a power consumption event that can be identified by the power manager. Thus, the power manager during the particular power consumption event, e.g., during the low-activity interval of the hours of 1 a.m. to 6 a.m., would allow, for example, a fuel cell to maintain storage of more of the electrical energy while allowing the 1 volt battery cell to store less of the electrical energy, i.e., to droop voltage somewhat, during those hours of no use of the mobile phone device. The leakage current or self discharge current of the fuel cell would be lower than the leakage current or self discharge current of the 1 volt battery. The lower voltage of the 1 volt battery cell would waste less energy due to self discharge. This then would allow the mobile phone to leverage the use of the combination of energy storage device technologies to maximize overall battery life for the mobile phone.

According to certain embodiments, during a low-activity interval (e.g., at the start of the interval) a power manager would cause electrical energy to transfer from the 1 volt battery cell (and possibly from one or more other relatively unused energy storage devices) to a fuel cell, thereby moving almost all of the stored energy to the fuel cell to minimize leakage current or self discharge current from other energy storage devices of the portable electronic device. This proactive transfer of electrical energy between energy storage devices would further help leverage the storage of energy in those energy storage device technologies that would maximize overall battery life for the portable electronic device.

According to one example implementation of a power management system, a portable electronic device comprises a fuel cell; a battery; a capacitor; and a controller that directs energy to a load from one of the fuel cell, the battery, and the capacitor. One of the applications of such a system may exist in a portable electronic device that can recognize that a power consumption event is occurring (i.e., the portable electronic device is executing the power consumption event) in the near future in which there will be a large energy draw, for which the capacitor is best suited to supply the required energy:

A method for such a system, for example, comprises identifying a pending high energy demand (or high power consumption) event; storing energy in (and optionally moving energy into) a capacitor after identifying the pending high energy demand event; and executing the event (i.e., operating the high power consuming electrical circuits) using the energy stored in the capacitor.

Described below are detailed examples of systems and methods for providing power management for a portable electronic device according to various embodiments of the present disclosure. Referring to FIG. 1, a wireless communication device 100, such as a mobile phone, is shown. Such a wireless communication device 100 communicates with a wireless voice or data network 904 using a suitable wireless communications protocols. Wireless voice communications are performed using either an analog or digital wireless communication channel. Data communications allow a wireless communication device 100 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The mobile phone 100, in this example, includes a display 102 for displaying information to a user of the device. In this example, the display 102 comprises a graphical display that can display color images, text and other information. For example, the display screen can display an indicator indicative of energy stored in an energy storage device for the mobile phone 100. Similarly, a mobile phone with a plurality of energy storage devices can have a respective plurality of indicators displayed on the display screen to indicate a level of energy stored in each of the plurality of energy storage devices for the mobile phone 100.

The mobile phone 100 also includes various user input devices 104, such as buttons, keys, switches, and the like. The mobile phone 100 includes, for example, a trackball, a touch pad, or a navigational pad 106, which can track finger movement on top of the navigational device 106. A touch screen 107 allows a user of the device 100 to touch the screen 102 via the touch screen device 107 and thereby provide user input to the device 100.

The mobile phone 100 also includes one or more speaker outputs 103 and a microphone input 108. The speaker 103 and microphone 108 can be used as a phone ear piece and mouth piece to listen and talk while using the mobile phone 100.

The mobile phone 100 can be inserted into a holster case 120. The holster case 120 helps to protect the mobile phone 100 from external hazards as well as the holster case 120 can facilitate carrying the mobile phone 100 on one's person, such as hanging from one's belt or back pack or other clothing item. The holster case 120 has an opening 122 that allows the mobile phone 100 to be inserted into the holster case 120 with a flap cover 124 that can be rotated 125, as shown in FIG. 1, to close the holster case 120 with the mobile phone secured and protected inside.

A Velcro feature 126 located on the holster case 120 mates with a Velcro feature (not shown) on the flap 124 such that the flap 124 secures to the holster case via the Velcro feature 126. Optionally, openings 128 in the holster case 120 allow a user to use the microphone 108 while the mobile phone 100 is contained in the holster case 120. Other one or more openings in the holster case 120 (not shown) permit audio from the mobile phone 100 to be emitted through the holster case 120 such as for a user of the mobile phone 100 to conveniently hear the audio emitted from the mobile phone 100.

Figure 2:
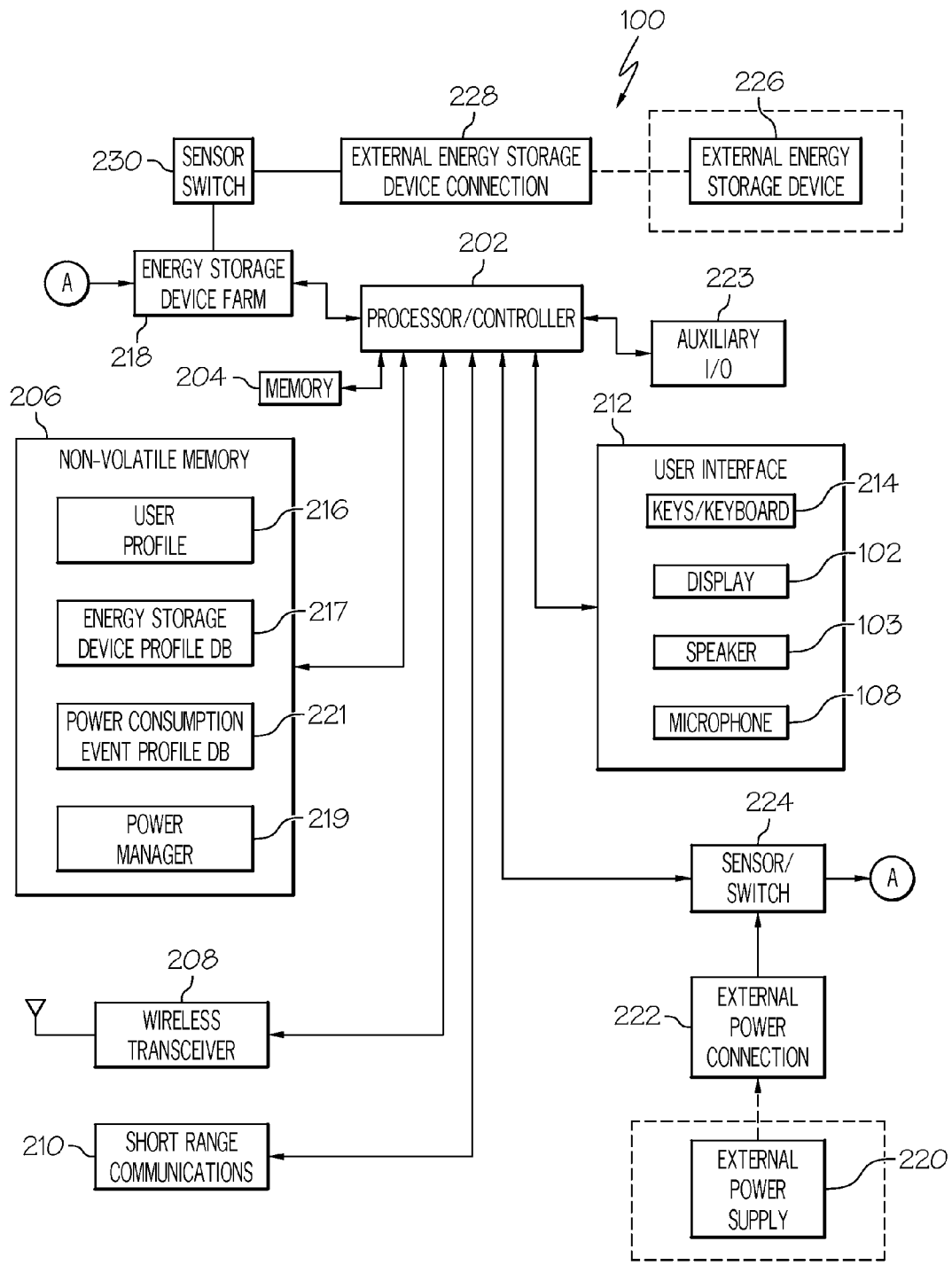
FIG. 2 is a block diagram illustrating a more detailed view of the mobile phone in FIG. 1 according to one example.

Referring to FIG. 2, a more detailed view of the mobile phone 100 is shown. A processor/controller 202 is communicatively coupled to memory device 204 and to non-volatile memory device 206. The non-volatile memory 206 can store program and data that are used by the processor/controller 202 to perform message and procedures for operating and controlling the mobile phone device 100.

Operating system software used by the processor/controller 202 is stored in non-volatile memory 206. Further examples are able to use a battery backed-up RAM or other non-volatile storage data elements to store operating systems, other executable programs, or both. The operating system software, device application software, or parts thereof, are able to be temporarily loaded into volatile data storage such as RAM memory 204. Data received via wireless communication signals or through wired communications are also able to be stored to RAM memory 204. As an example, a computer executable program configured to perform the power management process, i.e., a power manager 219, is included in a software module stored in non-volatile memory 206.

The processor/controller 202, in addition to its operating system functions, is able to execute software applications on the mobile phone 100. A set of applications that control basic device operations, including at least data and voice communication applications, is able to be installed on the mobile phone 100 during manufacture. Examples of applications that are able to be loaded onto the device 100 may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the mobile phone 100 through, for example, a wireless network, an auxiliary I/O device 223, a USB port, short-range communications subsystem 210, or any combination of these interfaces. Such applications are then able to be installed by a user in the RAM memory 204 or the non-volatile memory 206 for execution by the processor/controller 202.

In a data communication mode, a received signal such as an email, a text message, or a web page download, is processed by a communication subsystem, including a wireless transceiver 208, and communicated data is provided to the processor/controller 202, which is able to further process the received data for output to the display 102, or alternatively, to an auxiliary I/O device 223 or a USB port. A user of the mobile phone 100 may also compose data items, such as e-mail messages and/or text messages, using the keyboard 214, which is able to include a complete alphanumeric keyboard or a telephone-type keypad, in conjunction with the display 102 and possibly an auxiliary I/O device 223. Such composed items are then able to be transmitted over a communication network through the wireless transceiver 208 of a communication subsystem of the mobile phone device 100.

For voice communications, overall operation of the mobile phone 100 is substantially similar, except that received signals are generally provided to a speaker 103 and signals for transmission are generally produced by a microphone 108. Alternative voice or audio I/O subsystems, such as a voice message recording subsystem, may also be implemented on the mobile phone 100. Although voice or audio signal output is generally accomplished primarily through the speaker 103, the display 102 may also be used to provide an indication of the identity of a calling party, the duration of a voice call, or other voice call related information, for example.

Depending on conditions or statuses of the mobile phone 100, one or more particular functions associated with a subsystem circuit may be disabled, or an entire subsystem circuit may be disabled. For example, if a primary battery temperature is high, then voice functions may be disabled, but data communications, such as e-mail, may still be enabled over a communication subsystem.

According to the present disclosure, a user profile 216 is stored in the non-volatile memory 206. The user profile 216 contains information about one or more user's use of the mobile phone 100. For example, the user profile 216 can contain time and date information associated with different types of use of the mobile phone 100 by a particular user.

The non-volatile memory 206 includes an energy storage device profile data base 217. The energy storage device profile data base 217 contains information about the energy storage devices associated with the energy storage device farm 218, which will be discussed in more detail below. The non-volatile memory 206 also includes a power consumption event profile data base 221.

The power consumption event profile data base 221 contains information about various defined events that can occur in the operation of the mobile phone device 100. Each of these defined events can be associated with a defined level of power consumption requirements. A power manager 219 is stored in the non-volatile memory 206. The power manager 219 utilizes the information from the user profile 216, the energy storage device profile data base 217, the power consumption event profile data base 221, and other information from the operations of the mobile phone device 100, both current operations and forecasted operations in the near-future, to manage an overall power utilization by the mobile phone device from it's energy storage devices associated with the energy storage device farm 218.

The power manager 219 manages the energy storage and energy transfer between the energy storage devices in the energy storage device farm 218 to serve the power consumption requirements of various loads from the electrical circuits operating in the mobile phone device 100. The power manager 219 thereby manages energy storage in the energy storage devices farm 218 to provide power to serve the current and forecasted power consumption requirements of the operation of the mobile phone device 100. An objective of the power manager 219 is to extend overall battery life of the mobile phone device 100.

A wireless transceiver 208, according to the present example, includes transmitter circuits coupled to an antenna and receiver circuits coupled to an antenna, which may be the same antenna in certain embodiments. The wireless transceiver 208 is used by the mobile phone 100 to enable wireless communications in a wireless communication system. The transmitter circuits in the wireless transceiver 208 typically include power amplifier (PA) circuits which are used to generate sufficient transmitter power to transmit signal through the antenna and thereby wirelessly transmit the signal in a wireless communication system. The power amplifier circuits consume large amounts of power during their operation. This type of event places a high demand for electrical power from the energy storage device being used by the mobile phone device 100. By planning for this high power consumption event in the mobile phone 100, the power manager 219 can allocate an energy storage device associated with the energy storage device farm 218 to meet such high power requirements during the event while at other times managing the energy storage in the energy storage devices in the farm 218 for providing power for other events and thereby extending overall battery life for the mobile phone 100. The operations of the power manager 219, according to various examples, will be discussed in more detail below.

While the present example uses a wireless transceiver 208, alternative embodiments may incorporate communication subsystem elements such as a wireless transmitter, a wireless receiver 908, and associated components such as one or more antenna elements. Also, various embodiments may include a digital signal processor (DSP) to perform processing to extract data from received wireless signals and to generate signals to be transmitted. The particular design of the communication subsystem is dependent upon the communication network and associated wireless communications protocols with which the device 100 is intended to operate.

The mobile phone 100 can include short range communication circuits 210 that provide a means for the mobile phone 100 to communicate with other devices having similar short range communication abilities. The short range communication circuits 210 allow the mobile phone 100 to communicate with other devices via a short range wireless network. The short range wireless network can be based on any short range wireless technology such as, but not limited to, Infrared Data Association (IrDA), Bluetooth®, Zigbee®, and Near Field Communication (NFC) technologies. It should be noted that the mobile phone 100 can also comprise other wireless link interfaces that allow the mobile phone 100 to communicate over one or more additional wireless networks such as wireless local area networks and/or the like.

The mobile phone 100 includes a user interface 212 that can receive user input from the user of the device 100, such as by keys, keyboard 214 and other user input devices such as a track ball, a touch pad or a navigational pad 106, which can track finger movement on top of the navigational device 106, or a touch screen device 107. The user interface 212 can additionally receive audio input as a type of user input via the microphone 108. The user interface 212 also can provide user output to a user of the device. For example, a display 102 displays information to a user of the device 100. A speaker 103 provides audio output to the user of the device 100.

The mobile phone 100 can replenish the energy stored in one or more energy storage devices in the energy storage device farm 218 from an external power supply 220, such as an AC outlet and power supply that can be connected, in one non-limiting example, by a power cord and adapter to the mobile phone device 100. The external power supply 220 as shown in FIG. 2 is external to the mobile phone device 100. It is electrically coupled via an external power connection 222 to the mobile phone device 100. The controller 202 can control sensor/switch circuits 224 to manage electrical power transfer and to detect power when available from the external power supply 220. The sensor switch circuits 224 are controllable to electrically couple the electrical power from the external power supply 220 to an energy storage device, or multiple energy storage devices, in the energy storage device farm 218.

An external power connection 222 may comprise alternative technologies for electrically coupling power to the mobile phone device 100. For example, a USB, or micro USB, interface may be used to provide power to the mobile phone device 100. Alternatively, a power cord and adapter may plug directly into an AC mains outlet.

An auxiliary input and output interface 223 provides alternative means for communicating data between the mobile phone device 100 and other external devices.

In certain embodiments, the energy storage device farm 218 can be electrically coupled to, and thereby include, an external energy storage device 226. The external energy storage device 226, for example, can be located in the holster case 120 shown in FIG. 1. By utilizing an external energy storage device 226 the mobile phone 100 can transfer (or move) power from this external energy storage device 226 and direct it to one or more internal energy storage devices in the energy storage device farm 218. The external energy storage device 226 can be a larger form factor than the size of the mobile phone device 100. The external energy storage device 226 can be electrically coupled, via an external energy storage device connection 228 and through a sensor/switch 230 that is controllable by the processor/controller 202, to the energy storage device farm 218. In this way, the external energy storage device 226 is part of the energy storage device farm 218.

In one example embodiment, the external energy storage device 226 comprises an energy harvesting source. The external energy storage device 226, according to various embodiments, may comprise a fuel cell. A fuel cell typically has a very high energy density (see FIG. 7) which can be stored in a fairly small space and can provide electrical power over a long period of time. According to one example embodiment, one of the energy storage devices in the energy storage device farm 218 comprises a fuel cell that is included in the mobile phone device 100.

The external energy storage device 226 is electrically coupled to the energy storage device farm 218 via an external energy storage device connection 228 and through sensor/switch 230 that is controllable by the processor/controller 202. The sensor portion of the sensor/switch 230 allows the processor controller 202 to sense the energy level at the external energy storage device connection 228 while the switch portion of the sensor/switch 230 is controllable by the processor/controller 202 to selectively provide the energy from the external energy storage device 226 into the energy storage device farm 218.

Figure 3:
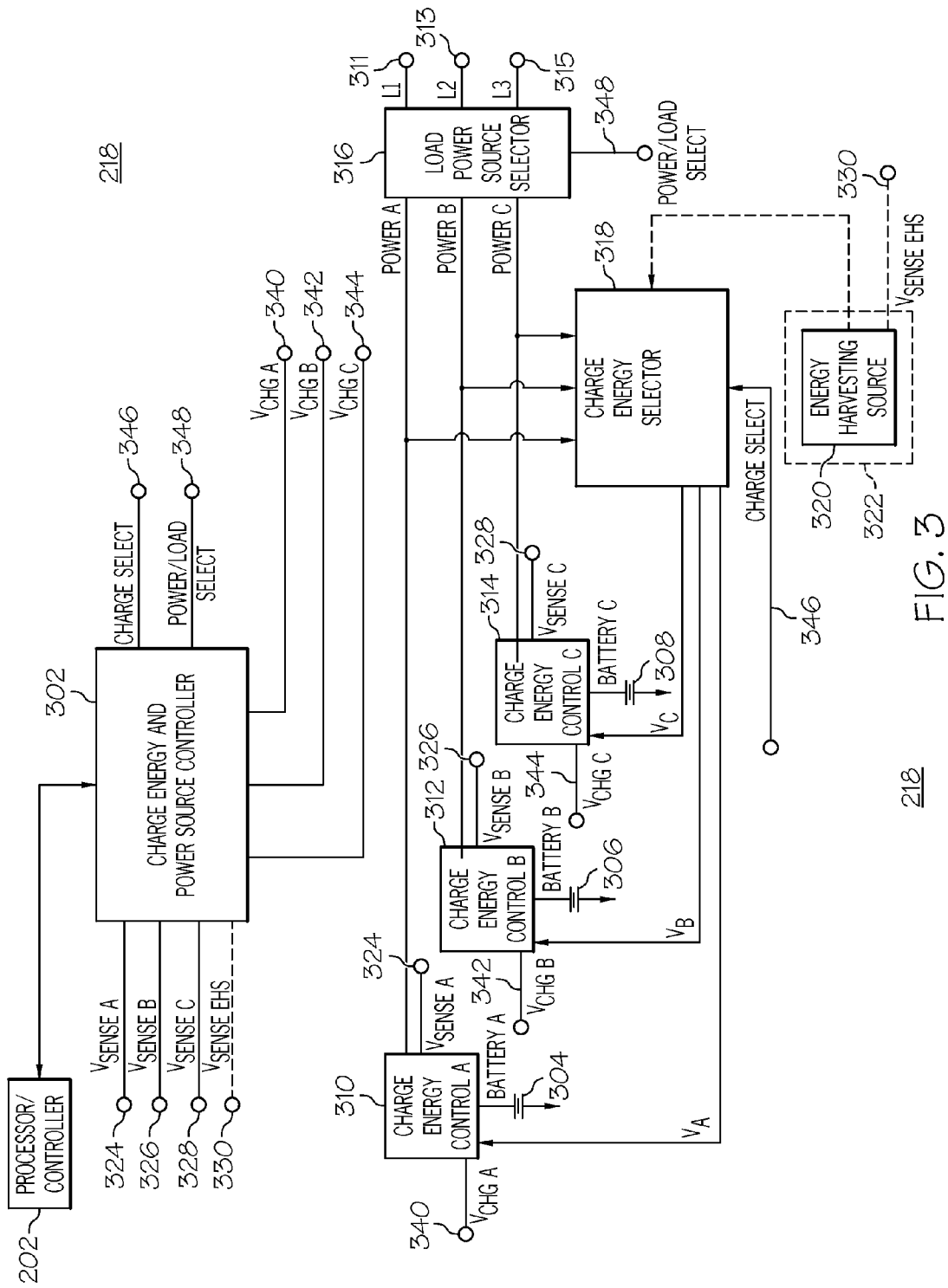
FIG. 3 is a block diagram illustrating a more detailed view of the mobile phone shown in FIG. 1 according to one example.

Referring to FIG. 3, a more detailed view of the energy storage device farm 218 is shown. The energy storage device farm 218 includes a charge energy and power source controller (or control circuit) 302. The charge energy and power source controller 302 is communicatively coupled with the processor/controller 202 for managing the energy storage devices associated with the energy storage device farm 218, as will be discussed in more detail below.

The energy storage device farm 218, as part of a power subsystem for the mobile phone 100, includes power distribution circuitry for providing power from the energy storage devices to various circuit loads of the mobile phone 100.

In the present example, three different types of batteries and an external energy harvesting source 320 are used by a mobile phone 100. The external energy harvesting source 320 is located in an external location 322 outside of the mobile phone device 100, such as in the holster case 120. A first battery 304 (battery A), a second battery 306 (battery B), and a third battery 308 (battery C) are located in the mobile phone 100 and associated with the energy storage device farm 218.

Battery A 304 is electrically coupled to a charge energy control A circuit 310 that can be controlled by the charge energy and power source controller 302 to switch the battery A 304 from a battery charging mode to a battery power source mode, and vice versa. The voltage sense A output line 324 is monitored by the charge energy and power source controller 302 to determine the charge or voltage level of battery A 304. The voltage charge A control line 340 provides a control signal from the charge energy and power source controller 302 to the charge energy control A circuit 310 to switch battery A 304 between the charging mode and the power source mode.

In the power source mode, battery A 304 is providing the power output through the charge energy control A circuit 310 to a load power source selector 316, as shown in FIG. 3. Power from battery A 304 can then be directed and coupled through the load power source selector 316 to a circuit load in the mobile phone device 100. For example, as shown in FIG. 3, there are three separate circuits, i.e., L1 311, L2 313, and L3 315. Each of these three separate circuits 311, 313, 315, have respective circuit loads. Each of these three circuits 311, 313, 315, is selectable as a destination of power from the battery A 304.

The load power source selector 316, under control from the charge energy and power source controller 302, can similarly select output power from any one of the other two batteries 306, 308, to provide power to one or more of the circuit loads 311, 313, 315.

The load power source selector 316, according to this example, comprises analog switches and an analog multiplexer circuit that can be controlled by the charge energy and power source controller 302 via the power/load select signal line 348, as shown in FIG. 3. The signals on the power/load select signal line 348 select one or more inputs (i.e., Power A, Power B, and Power C) into the load power source selector 316 which routes power from one of the three batteries 304, 306, 308, and connects the power source (or sources) with the one or more circuit loads 311, 313, 315. While this example uses analog switches and multiplexer circuits to route the power signals from one or more power sources to one or more destination circuit loads, it should be understood that other switching technology and switching circuit elements can be similarly used in alternative embodiments.

In the transfer (or movement) of power, there may optionally be a need to use DC to DC converters (not shown) in the load power source selector 316, which can provide step-up conversion as well as step-down conversion for particular power transfer applications. Additionally, active rectification by use of switching power transistors, such as power MOSFETs or power BJTs, (not shown) allows transfer (movement) of power without significant loss of power due to the DC to DC converter and rectification circuits. Modern DC to DC converter circuits can be relatively efficient in the transfer of energy without much loss due to circuit operation and heat loss.

The DC to DC converter circuit can be operated in a one directional configuration or it could optionally be operated in a bi-directional configuration, such that DC to DC conversion can be selected in either direction based on a particular requirement of a power transfer operation and analog switching topology. The flexible use of one directional or bi-directional DC to DC converter circuits in combination with analog switches and multiplexer circuits permits an efficient means for the load power source selector 316 to transfer and direct power from any of the first battery 304, the second battery 306, or the third battery 308, to any of the circuit loads L1 311, L2, 313, and L3 315, under control of the power manager 219 and the charged energy and power source controller 302.

As can be seen in FIG. 3, the second battery 306 is associated with a charge energy control B circuit 312 and the third battery 308 is associated with a charge energy control C circuit 314, similar to the first battery 304 and its charge energy control A circuit 310. A voltage charge B control line 342 from the charge energy and power source controller 302 to the charge energy control B circuit 312 switches the second battery 306 from a charge mode to a power source mode, and visa versa. A voltage charge C control line 344 from the charge energy and power source controller 302 to the charge energy control C circuit 314 switches the third battery 308 from a charge mode to a power source mode, and visa versa.

A voltage sense B output 326 from the charge energy control B circuit 312 is monitored by the charge energy and power source controller 302 to determine a voltage level of the second battery 306. A voltage sense C output line 328 from the charge energy control C circuit 314 is monitored by the charge energy and power source controller 302 to monitor a voltage level of the third battery 308. A voltage sense EHS output line 330 from the energy harvesting source 320 is monitored by the charge energy and power source controller 302 to monitor a voltage level of the energy harvesting source 320.

A charge energy selector 318 is controlled by a charge select control line 346 from the charge energy and power source controller 302 to select one or more power source devices 304, 306, 308, 320, and route charging power to one or more destination energy storage devices 304, 306, 308. The charge energy selector 318, in the present example, comprises analog switches and multiplexer circuits that are controlled by signals on the charge select signal line 346. Additionally, the charge energy selector 318 may include power conditioning circuits and one or more DC to DC converters.

The charged energy selector 318, according various embodiments, can include analog switches and a multiplexer circuit to route power signal from one or more of the power source inputs (i.e., Power A, Power B, Power C, and output from the energy harvesting source 320) to one or more of the charge destination outputs (i.e., $V_A$, $V_B$, and $V_C$) that feed charging energy to one or more of the energy storage devices 304, 306, 308. In the transfer of charging energy there may optionally be a need to use DC to DC converters which can provide step-up conversion as well as step-down conversion for particular charging applications. Additionally, active rectification by use of switching power transistors, such as power MOSFETs or power BJTs, (not shown) allows transfer of power and charging energy without significant loss of power due to the DC to DC converter and rectification circuits. Modern DC to DC converter circuits can be relatively efficient in the transfer of energy without much loss due to circuit operation and heat loss.

The DC to DC converter circuit can be in a one directional configuration or it could optionally be designed in a bi-directional configuration, such that DC to DC conversion can be selected in either direction based on a particular requirement of a power transfer operation and analog switching topology. The flexible use of one directional or bi-directional DC to DC converter circuits in combination with analog switches and multiplexer circuits permits an efficient means for the charge energy selector 318 to transfer power for charging selectively any of the first battery 304, the second battery 306 or the third battery 308, according to a power management scheme under control of the power manager 219 and the charged energy and power source controller 302.

Additionally, as shown in FIG. 3, the energy harvesting source 320 can be electrically coupled through the charge energy selector circuits 318 to any one or more of the three batteries 304, 306, 308, to charge the selected battery (or batteries) with charging energy from the energy harvesting source 320. In this way, for example, when the mobile phone device 100 is located in the holster case 120 the power manager 219 can selectively replenish energy into any one or more of the energy storage devices 304, 306, 308.

When a particular energy storage device 304, 306, 308 is in a charging mode, by control signaling on the voltage charging control line 340, 342, 344, that power source is typically not available to provide power to any one of the circuit loads 311, 313, 315. During the charging period, an alternative power source, other than the one being charged, can be selectively coupled through the load power source selector 316 to the one of the circuit loads 311, 313, 315. The charge energy and power source controller 302 sends signals via the power load select control signal line 348 to the load power source selector 316 to selectively decouple from the one of the circuit loads 311, 313, 315, the particular power source being re-charged and to replace it by one of the other power sources available to provide power to the one of the circuit loads 311, 313, 315.

For example, if the first battery 304 (battery A) is to be charged with charging power from the energy harvesting source 320, then the charge energy and power source controller 302 sends control signaling through the power load select signal line 348 to the load power source selector 316 to selectively decouple the first battery 304 from the one of the circuit loads 311, 313, 315. In place of the first battery 304, the charge energy and power source controller 302 sends control signaling to selectively couple one of the other power sources available 306, 308, to the one of the circuit loads 311, 313, 315.

The charge energy and power source controller 302 then send control signaling via the voltage charge A control signal line 340 into the charge energy control A circuit 310 to place the first battery 304 into a charging mode. The charge energy and power source controller 302 also sends control signaling via the charge select line 346 to the charge energy selector 318 to select the energy harvesting source device 320 as the power source for charging the first battery 304.

A similar process can be followed by the charge energy and power source controller 302 to electrically couple any one of the power sources 304, 306, 308, 320, to a particular energy storage device (other than the power source device) for charging the particular energy storage device 304, 306, 308. For example, the second battery 306 can be electrically coupled through the charge energy selector 318 to the first battery 304 to charge the first battery 304. As optionally may be desired, a step-up DC to DC converter (or alternatively a step-down DC to DC converter) can be used in the charge energy selector 318. By maintaining power to the destination circuit load 311, 313, 315, while charging and replenishing energy to the particular energy storage device 304, 306, 308, the charge energy and power source controller 302 and the power manager 219 manage the amount of energy stored in each of the energy storage devices 304, 306, 308, while maintaining normal operations of the mobile phone 100.

To match the available stored energy from the energy storage device farm 218 for powering particular load events in one or more of the circuit load circuits 311, 313, 315, the power manager 219 can utilize the information in the energy storage device profile data base 217 and in the power consumption event profile data base 221, as will be discussed below. The energy storage device profile data base 217 maintains individual records for each of the energy storage devices in the energy storage device farm 218. In this example, with reference to FIGS. 3, 5, and 6, the energy storage device profile data base 217 maintains individual records 502, 504, 506, 508, for the first battery 304, the second battery 306, the third battery 308, and the energy harvesting source device 320. The records 502, 504, 506, 508, in the energy storage device profile database 217 identify characteristics 512 of the particular energy storage device, the monitored level of voltage 514 available from the particular energy storage device, and the status 516 of the energy storage device. The power manager 219 also can correlate an occurrence of a power consumption event, or an imminent occurrence of the event, to a power consumption event profile record 602, 604, 606, 608, 610, in the power consumption event profile data base 221. The power consumption event profile record for a particular event includes information about the event, such as the level of power that the event requires 614, the time duration of the event 616, and other related information about the event 618 that may be useful for determining a match between, for example, a stored energy level of at least one of the available energy storage devices 304, 306, 308, 320, and the power requirements of the particular power consumption event.

Additionally, by maintaining a user profile 216 the power manager 219 can more proactively manage the power available for not only current power consumption events but near term forecasted imminent events that can be planned for by the power manager 219. The power manager 219 best matches the energy storage device profile record 502, 504, 506, 508, (of an energy storage device selected to provide power) to the power consumption event profile record 602, 604, 606, 608, 610, of an event that is currently occurring, or that is imminent.

This best matching process allows the power manager 219 to manage the available energy in the farm 218 to power occurring events while maximizing battery life for the mobile phone device 100. It should be noted that extending battery life of the mobile phone device 100 while matching the available power source characteristics (e.g., the stored energy level of an energy storage device) to the requirements of the occurring power consumption events of circuit loads is one advantage of the present disclosure. As power consumption events are forecasted to occur, the power manager 219 can plan to provide energy from an energy storage device with characteristics that best match the requirements of the upcoming power consumption event while not wasting too much energy due to mismatched requirements of current power consumption events and the characteristics of the currently available energy storage device (e.g., its stored energy level). That is, for example, if an energy storage device holds too high of a voltage that is not required to meet the immediate or near term requirements of occurring power consumption events, the energy storage device may likely leak and waste stored energy and dissipate it as heat. On the other hand, of course, if the level of energy stored in an energy storage device is too low for an upcoming event then the mobile phone 100 will fail to serve the electrical power requirements of the occurring event.

As power consumption events occur the power manager 219 and the charge energy and power source controller 302 interoperate to both match a particular power source 304, 306, 308, 320, to a circuit load 311, 313, 315 that requires a particular amount of power while at the same time distributing energy between the available energy storage devices 304, 306, 308, to plan the availability of the amount of energy in a particular energy storage device to an upcoming power consumption event for any one or more of the circuit loads 311, 313, 315 in the mobile phone device 100.

The power manager 219 updates the user profile 216 to keep track of the different types of uses of the mobile phone device 100 by a particular user over a particular period of time. For example, a steady state user profile 402 in the user profile 216 could be used by the power manager 219 to track occurrences of power consumption events in the mobile phone 100 over a day or over a week, or longer time period. In that way the user profile 216 would track the likely use of the device 100 during certain times of a day, based on long term use patterns.

In the user profile 216, the power manager 219 can also be managing a current (or dynamic) user profile 404, which tracks what a user is currently doing with the mobile phone device 100. For example, the dynamic user profile 404 tracks the occurrences of power consumption events occurring during the last several hours. In that way, the user profile 216 would track the likely use of the device 100 during certain times of the day, based on short term use patterns.

Therefore, the power manager 219 can utilize the information from any one or a combination of the steady state user profile 402 and the dynamic user profile 404 to better predict and forecast the power consumption events that will likely occur in the mobile phone device 100 during certain times of the day.

Additionally, based on the dynamic usage profile 404 for a particular user of the mobile phone device 100 the power manager 219 can determine a desired reserve power or energy level in one or more of the various energy storage devices in the farm 218 to match the likely occurrences of power consumption events. The power manager 219 therefore can select any one of the available energy storage devices 304, 306, 308, to match currently occurring events as well as plan to match a reserve of energy in any particular energy storage device for matching requirements of imminently occurring future power consumption events. The power manager 219 can match a reserve of energy to requirements of imminently occurring events by transferring energy from one energy storage device to another energy storage device to meet the upcoming power consumption requirements. Additionally, the power manager 219 can utilize the information that the mobile phone device 100 is in the holster case 120. That is, whether the available energy from the energy harvesting source 320 can be utilized in the mobile phone device 100, such as to transfer energy from the energy harvesting source 320 to one of the other energy storage devices 304, 306, 308. In this way, the power manager 219 can proactively plan available electrical energy level stored in one of the energy storage devices 304, 306, 308, to meet forecasted demands from imminently occurring power consumption events in any of the circuit loads L1 311, L2 313, and L3 315.

Figure 4:
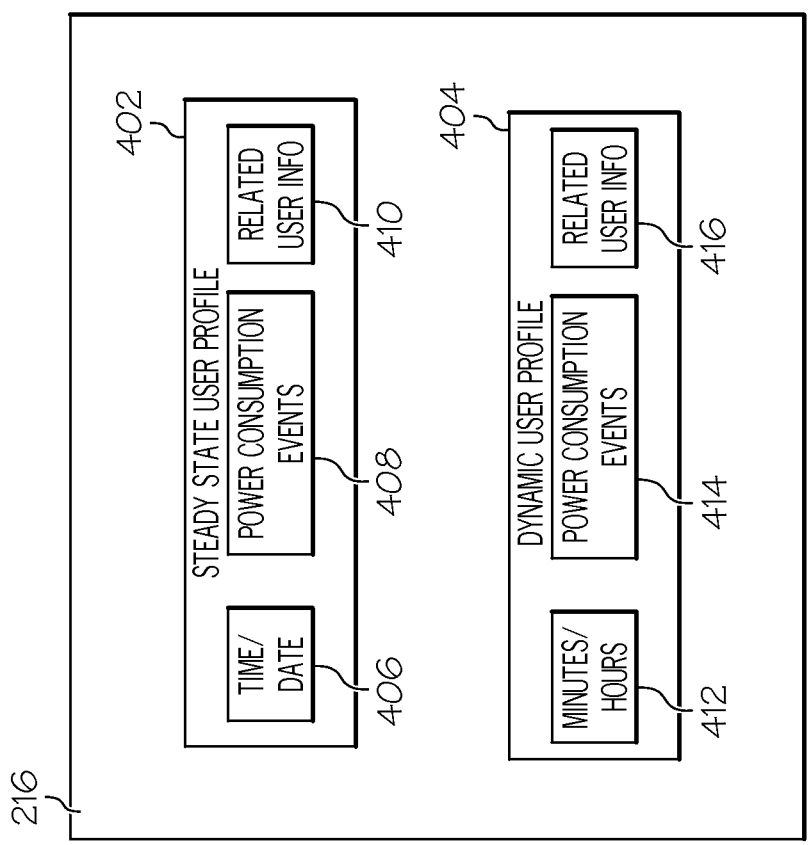
FIG. 4 is a block diagram illustrating a user profile according to one example.

Referring to FIG. 4, a more detailed view of the user profile 216 is shown according to one example. The user profile 216, in this example, includes a steady state user profile 402 which includes time and date information 406, power consumption event information 408, and related user information 410. The time and date information 406 can track the power consumption events 408 for the particular user over an extended period time of days or even a week or more. The related user information 410 is associated with each of the entries in the time and date information 406 and the power consumption event information 408.

A dynamic user profile 404 is included in the user profile 216. The dynamic user profile represents the user's use of the mobile phone device 100 within a much shorter period of time, such as minutes or the last several hours (e.g., the last five hours). The dynamic user profile 404 includes minutes/hours information 412 and power consumption events information 414 associated with the particular minutes and hours information 412. That is, the occurrences of the various power consumption events that occur while a user is using the mobile phone 100 are tracked over the most recent minutes or hours.

Additionally, related user information 416 is associated with the minutes and hours information 412 and with the power consumption events information 414. In this way, the power manager 219 can keep track of the user's short term use of the mobile phone device 100, as well as tracking the user's long term use in the steady state user profile 402. This information is used by the power manager 219 to plan what energy storage device best matches the current, and near term anticipated or forecasted, occurring power consumption events for the mobile phone device 100.

It should be noted that the example shown in FIG. 4 is only one applicable example and other information can be added to or deleted from the user profile 216. A user of the mobile phone 100, according to various embodiments, can create, delete, and/or modify certain information stored in user profile 216. In addition, the power manager 219 can dynamically update the information in the user profile 216 while monitoring the user's use of the device 100.

Figure 5:
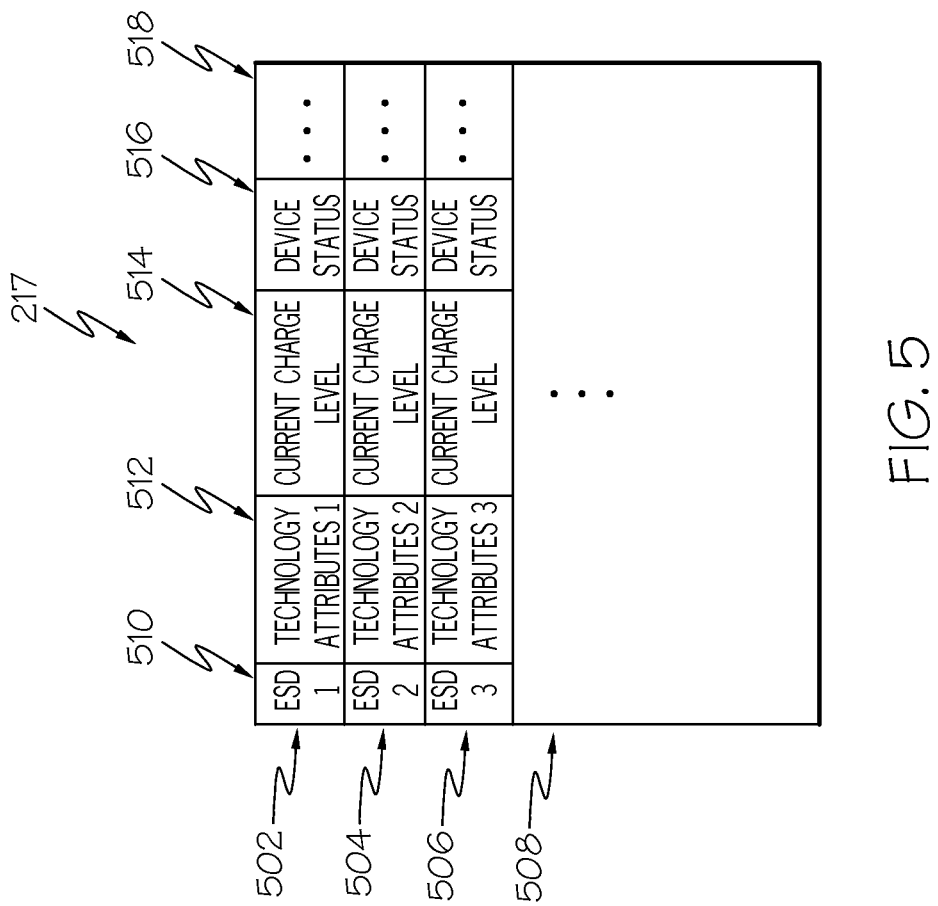
FIG. 5 is a block diagram showing an energy storage device profile according to one example.

Referring to FIG. 5, a more detailed view of an example of the energy storage device profile database 217 is shown. For each energy storage device 304, 306, 308, 320, a record 502, 504, 506, 508, maintains information for that energy storage device. As show in FIG. 5, there are three energy storage devices with three records 502, 504, 506. Additional records 508 may be added to the energy storage device profile database 217 as more devices are added to the system of the mobile phone 100.

For each record 502, 504, 506, 508, there is an ID field 510 identifying the particular energy storage device associated with the record. Additionally, a second field, i.e., a technology attributes (or characteristics) field, 512 indicates such device characteristics information as the energy storage device charge time, power output discharge rate, leakage current, energy density, nominal operating voltage, and the like. These are just a few of the parameters that are typically traded off between energy storage device technologies. Additionally, it should be noted that this field 512, according to various embodiments of the present disclosure, stores one or more parameters for these technology attributes (or characteristics). These parameters can be adjusted by a power manager in the portable electronic device as the energy storage device characteristics may change due to various factors, such as charge-discharge cycles experienced by the energy storage device, age of the energy storage device, field replacement of the energy storage device with another energy storage device of the same or different technology (i.e., replacement after the portable electronic device is manufactured and released into the marketplace). Thus, the attributes (or characteristics) of the energy storage devices in the portable electronic device would be dynamically tracked as they may change over time while in the field. The current capabilities of the energy storage devices could be tracked in this field 512, and not just the original capabilities of the energy storage devices that were manufactured along with the portable electronic device.

Optionally, a current charge level field 514 is maintained for each energy storage device associated with a record 502, 504, 506, 508. This field 514 tracks the level of energy stored in the energy storage device, as sensed by the charge energy and power source controller 302 monitoring the voltage sense outputs 324, 326, 328, and 330. The charge energy and power source controller 302 monitors voltage sense output 324, 326, 328, 330, from the various energy storage devices 304, 306, 308, 320, and can maintain updated the current charge level field 514 in each of the associated records 502, 504, 506, 508.

A device status field 516 is also maintained for each of the energy storage devices 304, 306, 308, 320. This device status field 516 in each of the records 502, 504, 506, 508, tracks the use status of the particular energy storage device associated with the record. One example of device status information, and not for limitation, may include device status for each energy storage device, as follows: 1) idle (not in use); 2) in a power output mode and associated with a particular electrical load circuit; 3) in a power output mode and associated with another energy storage device being charged; and 4) in a charge mode and being charged by power being sourced from an associated particular energy storage device. Other device status information can also be maintained for each of the energy storage devices 304, 306, 308, 320.

It allows the power manager 219 to proactively match power consumption events with the available energy storage devices. The other related information field 518 can also be maintained in the energy storage device records 502, 504, 506, to track other useful information for the energy storage devices.

It should be noted that the example shown in FIG. 5 is only one applicable example and other information can be added to and deleted from the energy storage device profile database 217. A user of the mobile phone 100, according to various embodiments, can create, delete, and/or modify certain information stored in the energy storage device profile database 217. In addition, the power manager 219 can dynamically update information in the energy storage device profile database 217 as well.

Referring to FIG. 6, a more detailed view of an example of the power consumption event profile database 221 is shown. The power consumption event profile database 221, in this example, is divided into two portions.

First, there is a power consumption event type list 601 which identifies the different types of power consumption events, one per record in this database. As shown in FIG. 6, there are four separate power consumption events in the list 601. The first record 602, and similarly the remaining records 604, 606, 608, include various fields of information. Additional records 610 may be included in the list 601 to define all the power consumption events that may be tracked for the mobile phone device 100. Each of the records 602, 604, 606, 608, includes a power consumption event field 612, a power requirement field 614, a typical event duration field 616, and related event information 618. For example, certain power consumption events may be associated with certain circuit loads 311, 313, 315, in the electronic circuits of the mobile phone device 100. This association with particular circuit loads 311, 313, 315, can be included as another field in the related event information 618.

A second portion of the power consumption event profile database 221 includes a power consumption event (PCE) queue 620. This PCE queue 620 includes a list of power consumption events being handled by the power manager 219. Each list item 622, 624, 626, in the PCE queue 620 includes various information to define a power consumption event that is currently being managed by the power manager 219, or a power consumption event that is forecasted to imminently occur.

Each list item 622, 624, 626, and 628, includes a power consumption event field 630 that identifies the event, an expected duration for the event field 632, an assigned energy storage device field 634, and other related information fields 636. For example, a power consumption event may be associated with a particular circuit load 311, 313, 315, for the various electronic circuits in the mobile phone device 100. This information can be stored in one of the other related information fields 636.

As shown in FIG. 6, the first list item 622 for the PCE queue 620 identifies power consumption event 3 630, associated with an expected duration 632 and with an assigned energy storage device 634. The power manager 219 assigns an energy storage device 304, 306, 308, to the event and stores an identification of the device in this assigned energy storage device field 634.

The second list item 624 shows that power consumption event 2 is being handled, or imminently handled, by the power manager 219. The third list item 626 shows that power consumption event 4 is being handled, or imminently to be handled, by the power manager 219. These power consumption events identified by the power consumption event field 630 are described in more detail in the power consumption event type list 601. In this way, the power manager 219 can track the power consumption events that are occurring, or soon to occur, and more proactively manage the various energy storage devices in the energy storage device farm 218 to meet the requirements of these power consumption events.

It should be noted that the example shown in FIG. 6 is only one applicable example and other information can be added to or deleted from the power consumption event profile database 221. A user of the mobile phone 100, according to various embodiments, can create, delete, and/or modify information in certain list items in the power consumption event type list 601. In addition, the power manager 219 can create, delete, and/or modify information in list items in the power consumption event type list 601. For example, device configuration data stored in the non-volatile memory 206 can be used by the processor/controller 202 and the power manager 219 to populate (or update information in) list items in the power consumption event type list 601. As another example, over-the-air transmitted information can be received by the mobile phone 100 and used by the processor/controller 202 and the power manager 219 to populate (or update information in) list items in the power consumption event type list 601.

FIG. 7 shows a comparison of energy density to power density performance for various electro-chemical energy storage device technologies. The Ragone plots in FIG. 7 show, for example, that ultracapacitors (SuperCapacitors) can deliver very high power but the storage capacity is very limited. This type of energy storage device, therefore, may be more suitable for providing power to a load experiencing a short term high power consumption event, such as providing power to a power amplifier (PA) during a transmitter operation. Alternatively, as shown in FIG. 7, fuel cells can store large amounts of energy but have a relatively low power output. Therefore, this type of energy storage device may be more suitable for providing power to a load experiencing a long term low power consumption event.

The sloping lines on the Ragone plots indicate the relative time to get the charge in or out of the energy storage device. At one extreme, power can be pumped into, or extracted from, capacitors in microseconds. This makes them ideal, for example, for capturing regenerative braking energy in EV applications. At the other extreme, fuel cells have a very poor dynamic performance taking hours to generate and deliver their energy. This limits their application in EV applications where they are often used in conjunction with batteries or capacitors to overcome this problem. Lithium batteries are somewhere in between and provide a reasonable compromise between the two.

While the discussion above is generally directed at electro-chemical energy storage device technologies, it should be understood that many different types of energy storage devices and technologies are available as alternatives for use according to various embodiments of the present disclosure. These energy storage devices can be more generally described by their abilities and/or characteristics, such as for example and not for limitation: 1) rate of charge with electrical energy, such as fast or slow charging; 2) source electrical power, such as high current power output with low output resistance or low current power output with high output resistance; 3) energy storage capacity such as high capacity or low capacity; 4) leakage current or self discharge current; and other abilities and attributes (or characteristics) as associated with various energy storage device technologies.

Additionally, for general reference and not for limitation, several examples of power scenarios and user value propositions are listed in the table (Table 1) below. Energy storage devices can be categorized by their use characteristics under different power scenarios that may be relevant for different implementations of portable electronic devices. In such a way, the selection of one of a plurality of energy storage devices in a farm may be guided by the characteristics of the energy storage device based on particular power usage scenario anticipated by the power manager. See the examples listed in Table 1 below which may be used in a power manager implementation.

TABLE 1

| Power Scenario | User Value |
| --- | --- |
| Rapid Charging | The device can be plugged into an AC source or placed on an inductive charging plate to instantly charge a SuperCap to save time when the user is on the go. |
| Slow Charging | The device can sit idle for a long duration overnight, in a holster, or idle during a meeting the device can slowly transfer current from the fuel cell to charge the other batteries. |
| Anticipating Demand | Power can be made available to a SuperCap when the phone application is launched to make high current available to the radio transmitter. |
| Peak Demand | When multi-tasking running a series of applications, the system can make adequate power available to run the CPU at full power without performance drops when switching between applications. |

Figure 8:
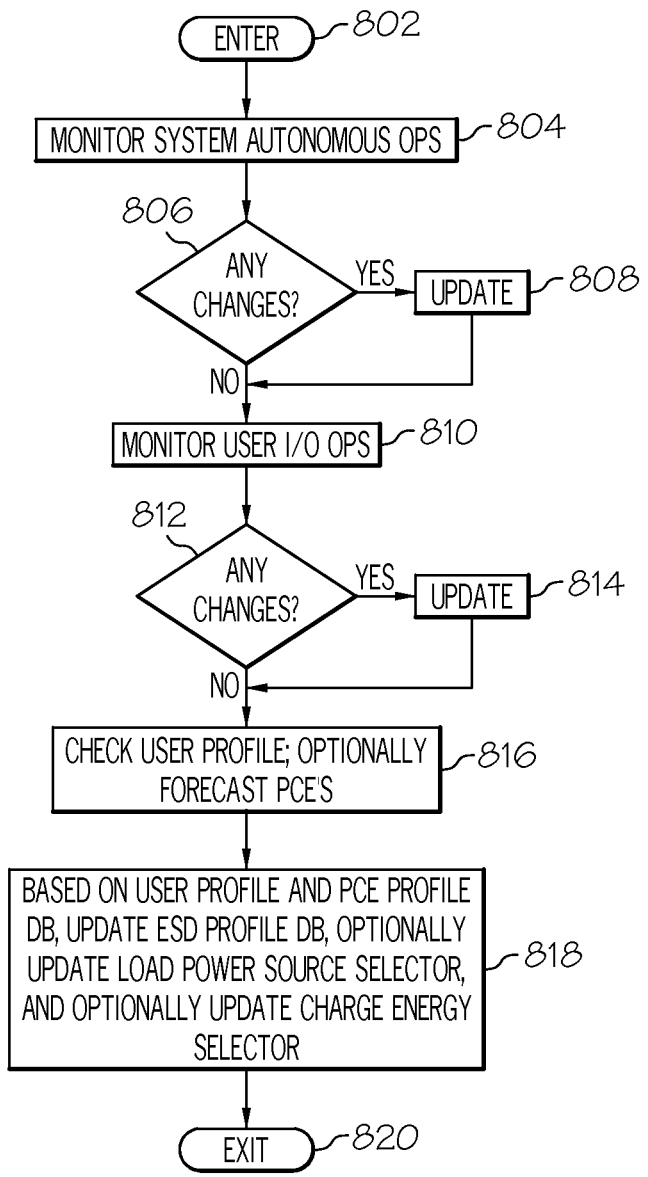
FIGS. 8 and 9 illustrate one example of a power management and energy storage device charging process performed by the mobile phone shown in FIG. 1.
Figure 9:
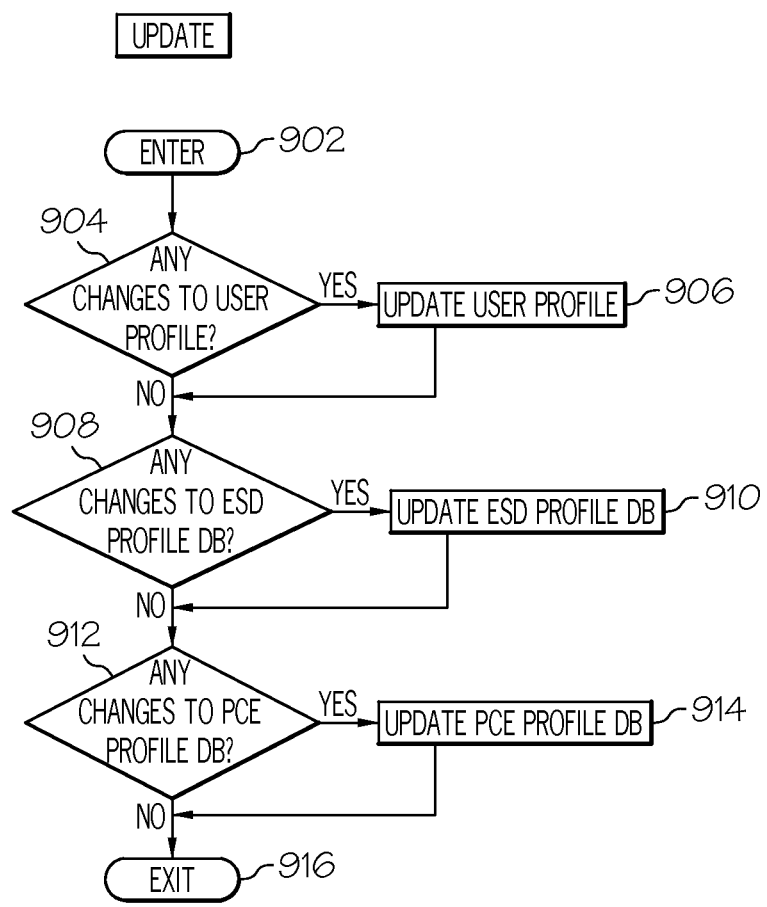

Referring to FIGS. 8 and 9, an example of a power management operational process for the power manager 219 is illustrated. The power manager 219 enters an operational process, at step 802, and proceeds to monitor system autonomous operations, at step 804. These types of operations include functions performed by the mobile phone device 100 independent of user input or output. For example, the system of the mobile phone 100 periodically operates to maintain communications with the overall communication system that the mobile phone device 100 operates in. These types of operations are independent of the user of the device 100.

At step 806, the power manager 219 checks whether it needs to make any changes (or updates) to the profiles and databases used by the power manager 219. These profiles and databases include, but are not limited to, the user profile 216, the energy storage device profile database 217, and the power consumption event profile database 221. If any changes are needed, at step 806, then the power manager 219 will refer to the update routine shown in FIG. 9, at step 808.

If no changes are needed, at step 806, or the update routine is finished, at step 808, then the power manager 219 will begin to monitor user input/output operations, at step 810. User input/output operations comprise those operations of the mobile phone that are directly dependent on the user's input to, or user output from, the mobile phone's user interface 212.

After monitoring user input/output operations, at step 810, the power manager 219 determines whether any changes are to be made, at step 812. If the power manager 219 notices that any changes are to be made, at step 812, then it will refer to the update routine, at step 814.

If no changes are to be made, at step 812, or the update routine, at step 814, is completed, then the power manager 219 proceeds to check the user profile 216, and optionally forecasts upcoming power consumption events, at step 816. Here the power manager 219 can, for example, add entries to the power consumption event queue 620 (i.e., to track power consumption events that are imminent to be served). The power manager 219 can remove entries from the queue 620 (i.e., to remove events that have already been served), or change entries in the queue 620 (i.e., to update events that are pending or in process of being served).

At step 818, the power manager 219, based on information in the user profile 216 and information in the power consumption event profile database 221, updates the device status 516 in the energy storage device profile database 217. In this way, the power manager 219 updates and tracks the status of each of the energy storage devices 304, 306, 308, 320. Optionally, the power manager 219 updates the power-load select input 348 to the load power source selector 316. Optionally, the power manager 219 updates the charge select input 346 to the charge energy selector 318. Thereafter, the power manager 219 will exit the process, at step 820.

Referring to FIG. 9, an update routine for the power manager 219 is shown. The power manager 219 enters the update routine, at step 902, and proceeds to check whether any changes are to be made to the user profile 216, at step 904. If the power manager 219 determines that changes are to be made, at step 904, then the power manager 219 updates information in the user profile 216, at step 906.

At step 908, the power manager 219 checks whether any changes are needed in the energy storage device (ESD) profile database 217. If the power manager 219 determines that changes are to be made, at step 908, the power manager 219 updates the ESD profile database 217, at step 910.

At step 912, the power manager 219 checks whether any changes are needed in the power consumption event (PCE) profile database 221. If the power manager 219 determines that changes are to be made, at step 912, the power manager 219 updates the ESD profile database 221, at step 914. Thereafter, the power manager 219 exits the update routine, at step 916.

According to one example device 100, a media reader (not shown) is able to be connected to an auxiliary I/O device 223 to allow, for example, loading computer readable program code of a computer program product into the mobile phone 100 for storage into non-volatile memory 206. In one example, computer readable program code includes instructions for performing the power management process, described above. One example of a media reader comprises an optical drive such as a CD/DVD drive, which may be used to store data to and read data from a computer readable medium or storage product such as computer readable storage media 944. Examples of suitable computer readable storage media include optical storage media such as a CD or DVD, magnetic media, or any other suitable data storage device. A media reader is alternatively able to be connected to the mobile phone 100 through a USB port or computer readable program code is alternatively able to be provided to the mobile phone 100 through a wireless network.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits.

Various Portable Electronic Device Examples

A). According to various embodiments of the present disclosure, a portable electronic device comprises:
   a first energy storage device having a first power output;
   a second energy storage device having a second power output, the second power output being greater than the first power output;
   an input device configured to receive an indication of a pending high energy demand event and to generate a high energy demand event signal; and
   a controller configured to receive the high energy demand event signal and to direct energy from the first energy storage device to the second energy storage device.

B). The portable electronic device of A), further comprising a transmitter electrically coupled to the second energy storage device, wherein the transmitter is configured to wirelessly transmit with energy from the second energy storage device.

C). The portable electronic device of A), wherein the first energy storage device comprises a fuel cell.

D). The portable electronic device of A), wherein the first energy storage device comprises a lithium battery.

E). The portable electronic device of A), wherein the second energy storage device comprises a SuperCapacitor.

F). According to various embodiments of the present disclosure, in a portable electronic device comprising a first energy storage device, a second energy storage device, and a third energy storage device, a method comprises:
   determining that the portable electronic device is in a low-activity interval; and
   in response to the determining, moving energy from the third energy storage device to the first energy storage device,
      wherein the first energy storage device has a first storage capacity, a first power output, and a first self discharge current;
      wherein the second energy storage device has a second storage capacity and a second power output, and
      wherein the second storage capacity is less than the first storage capacity and the second power output is greater than the first power output; and
      wherein the third energy storage device has a third storage capacity, a third power output, and a third self discharge current,
      wherein the third storage capacity is less than the first storage capacity and greater than the second storage capacity, and
      wherein the third power output is greater than the first power output and less than the second power output, and
      wherein the third self discharge current is greater than the first self discharge current.

G). According to various embodiments of the present disclosure, in a portable electronic device comprising a first energy storage device, a second energy storage device and a third energy storage device, a method comprises:
   determining that the one of the second energy storage device and the third energy storage is low on energy;
   moving energy from the first energy storage device to the energy storage device that is low on energy,
      wherein the first energy storage device has a first storage capacity and a first power output;
      wherein the second energy storage device has a second storage capacity and a second power output,
      wherein the second storage capacity is less than the first storage capacity and the second power output is greater than the first power output; and
      wherein the third energy storage device has a third storage capacity and a third power output,
      wherein the third storage capacity is less than the first storage capacity and greater than the second storage capacity, and
      wherein the third power output is greater than the first power output and less than the second power output.

H). The method of G), wherein the first energy storage device comprises a fuel cell.

I). The method of G), wherein the second energy storage device comprises a SuperCapacitor.

J). The method of G), wherein the third energy storage device comprises a lithium battery.

NON-LIMITING EXAMPLES

Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

What is claimed is:

1. A portable electronic device comprising:
   a first energy storage device having a first power output;
   a second energy storage device having a second power output, the second power output being greater than the first power output;
   an input device configured to receive an indication of a pending high energy demand event and to generate a high energy demand event signal; and
   a controller configured to:
      receive the high energy demand event signal;
      determine that the energy in the second energy storage device is insufficient to provide energy to execute a power consumption event anticipated to imminently occur after receiving the high energy demand signal; and
      in response to the determine that the energy in the second energy storage device is insufficient, direct energy from the first energy storage device to the second energy storage device just in time before executing the power consumption event using energy provided by the second energy storage device.

2. The portable electronic device of claim 1, further comprising a transmitter electrically coupled to the second energy storage device, wherein the transmitter is configured to wirelessly transmit with energy from the second energy storage device.

3. The portable electronic device of claim 1, wherein the first energy storage device comprises a fuel cell.

4. The portable electronic device of claim 1, wherein the first energy storage device comprises a lithium battery.

5. The portable electronic device of claim 1, wherein the second energy storage device comprises a capacitor.

6. The portable electronic device of claim 5, wherein the capacitor comprises a SuperCapacitor.

7. In a portable electronic device comprising a first energy storage device, a second energy storage device, and a third energy storage device, a method comprising:
  determining that the portable electronic device is in a low-activity interval; and
  in response to the determining, moving energy from the third energy storage device to the first energy storage device,
    wherein the first energy storage device has a first storage capacity, a first power output, and a first self discharge current;
    wherein the second energy storage device has a second storage capacity and a second power output, and
    wherein the second storage capacity is less than the first storage capacity and the second power output is greater than the first power output; and
    wherein the third energy storage device has a third storage capacity, a third power output, and a third self discharge current,
    wherein the third storage capacity is less than the first storage capacity and greater than the second storage capacity, and
    wherein the third power output is greater than the first power output and less than the second power output, and
    wherein the third self discharge current is greater than the first self discharge current.

8. The method of claim 7, wherein the first energy storage device comprises a fuel cell.

9. The method of claim 7, wherein the third energy storage device comprises a battery.

10. In a portable electronic device comprising a first energy storage device, a second energy storage device and a third energy storage device, a method comprising:
  determining that the one of the second energy storage device and the third energy storage is low on energy;
  moving energy from the first energy storage device to the energy storage device that is low on energy,
    wherein the first energy storage device has a first storage capacity and a first power output;
    wherein the second energy storage device has a second storage capacity and a second power output,
    wherein the second storage capacity is less than the first storage capacity and the second power output is greater than the first power output; and
  wherein the third energy storage device has a third storage capacity and a third power output,
    wherein the third storage capacity is less than the first storage capacity and greater than the second storage capacity, and
    wherein the third power output is greater than the first power output and less than the second power output.

11. The method of claim 10, wherein the first energy storage device comprises a fuel cell.

12. The method of claim 10, wherein the second energy storage device comprises a SuperCapacitor.

13. The method of claim 10, wherein the third energy storage device comprises a lithium battery.

14. The portable electronic device of claim 1, wherein the controller is configured to:
  direct energy from the first energy storage device to the second energy storage device to increase and maintain energy in the second energy storage device sufficient to meet the energy requirement to execute the power consumption event, wherein the energy is directed from the first energy storage device to the second energy storage device just in time before executing the power consumption event using the energy provided by the second energy storage device.

* * * * *